United States Patent Office 2,964,529
Patented Dec. 13, 1960

2,964,529

PYRIDINE CARBOXYLIC ACID PREPARATION

Murray G. Sturrock and Edwin L. Cline, Pittsburgh, and Kenneth R. Robinson and Kemper A. Zercher, Pitcairn, Pa., assignors to Koppers Company, Inc., a corporation of Delaware No Drawing. Filed Mar. 16, 1959, Ser. No. 799,481

17 Claims. (Cl. 260—295.5)

This invention relates to a method of making pyridine carboxylic acids. In one specific aspect, it relates to a novel ozonation technique for making mono- and di-carboxylic acids of pyridine and its nuclear-substituted derivatives.

The pyridine carboxylic acids are useful as food supplements and as intermediates for the preparation of pharmaceuticals. Of these acids, nicotinic acid (3-pyridine carboxylic acid) is a member of the vitamin B complex group and is extremely useful in the enrichment of foods to improve their nutritional values. Nicotinic acid is easily prepared by the decarboxylation of quinolinic acid (2,3-pyridine di-carboxylic acid). Cinchomeronic acid is also among the commercially significant pyridine carboxylic acids. On decarboxylation, it yields a mixture of nicotinic and isonicotinic acids. Isonicotinic acid, in the form of its azide, is used in treatment of tuberculosis.

The art of making pyridine carboxylic acids is well established. For instance, a well-known process for making nicotinic acid comprises mixing sulfuric acid and quinoline, and reacting the quinoline sulfonic acid thus formed with nitric acid at elevated temperatures. Nicotinic acid or cinchomeronic acid can be made by oxidizing quinoline or isoquinoline with sulfuric acid in the presence of a small amount of selenium compound at temperatures between 295–315° C. The extensive use of pyridine carboxylic acids in the food and pharmaceutical industries has given a considerable impetus to the quest for preparative methods which are more economical from the standpoint of raw material and process costs.

In recent years workers in the art have attempted to prepare pyridine carboxylic acids by treating a benzazine, such as quinoline or isoquinoline, with ozone. For example, Lindenstruth et al., J. Am. Chem. Soc. 71, 3020 (1949), reported the attempted ozonation of quinoline in an acetic acid medium, but only trace amounts of the desired quinolinic acid were recovered. These same investigators treated isoquinoline with ozone in the presence of acetic acid containing a small quantity of water. Cinchomeronic acid was thus obtained in a 44.5% yield. Boer et al., Rec. Trav. Chim. 70, 509 (1951), treated quinoline with ozone using chloroform as an ozonation medium. They obtained only a low yield (2.5%) of quinoline dialdehyde as a product. The results reported by Lindenstruth and Boer have lead workers in the art to the belief that it was not possible, using an ozonation technique, to develop a commercially significant method of making pyridine carboxylic acids. Ozone, in contrast with the conventional oxidizing agents used in the art, tends to attack both the benzene and N-hetero ring of the benzazine. This unoriented ozone attack results in the formation of only small quantities of the desired pyridine carboxylic acid and large quantities of an intractable tarry mass. Quite surprisingly, we have discovered a novel method of directing the ozone attack to the benzene nucleus, thus avoiding tar formation and producing the desired pyridine carboxylic acids in excellent yields.

It is, therefore, an object of the invention to provide a method of ozonating benzazines to produce pyridine di-carboxylic acids in high yield. It is a further object of the invention to provide a commercially feasible ozonation-decarboxylation technique for making valuable pyridine mono-carboxylic acids, such as nicotinic acid.

In accordance with the invention, ozone is contacted with a benzazine in a liquid medium containing a mineral acid, which is substantially inert to ozone attack, in an amount of at least about one mole of mineral acid per mole of benzazine to form ozonation products. The ozonation products are converted to pyridine di-carboxylic acids by heating the ozonized mixture in the presence of an oxidizing agent at a temperature below the boiling point of the mixture. A substantial part of the liquid portion of the mixture is removed, preferably by distillation. The pyridine di-carboxylic acid is recovered by filtration and is purified in a conventional manner. The pyridine di-carboxylic acid is easily converted, if desired, to a pyridine mono-carboxylic acid by decarboxylation.

Useful benzazines include quinoline, isoquinoline and the nuclear-substituted derivatives of quinoline and isoquinoline, in particular the lower alkyl, amino, halo and hydroxy quinolines and isoquinolines. We have found that the presence of these substituents on the carbocyclic ring promotes ozone attack thereon. The possible weakening effect of nuclear substitution in the heterocyclic ring is overcome in the invention by the salt formation, hereafter described, between the basic nitrogen of the heterocyclic ring and the mineral acid. In addition to quinoline and isoquinoline, exemplary benzazines useful in the invention include quinaldine, lepidine, carbostyril, 8-hydroxyquinoline, 2-aminoquinoline, and the like.

It is not necessary to use pure benzazines as starting materials. For example, a commercial 2° quinoline (i.e. an impure quinoline having a boiling point range of 2° C.) provides high yields of the desired pyridine carboxylic acid when treated according to the method of the invention. It is desirable, however, to choose a feed material which does not contain large quantities of polynuclear contaminants such as naphthalene, since such contaminants are attacked by ozone and the ozonation products produced therefrom interfere with the recovery of the product di-carboxylic acid. Impurity removal, if desired, may be accomplished by washing the benzazine with a hydrocarbon solvent, e.g. benzene, after the benzazine has been dissolved in the liquid medium. The benzazine-mineral acid salt is insoluble in benzene and similar solvents; thus the hydrocarbon-soluble impurities are readily removed therefrom and are absorbed by the organic layer. The organic layer is easily separated from the aqueous liquid medium by decantation. Benzene does not react readily with ozone and any remaining after decantation is rapidly expelled by the gas stream at the temperatures employed during ozonation.

The benzazine is dissolved in a liquid medium containing a mineral acid which is substantially inert to ozone attack. The presence of the mineral acid, which may comprise all or a part of the liquid medium is essential to the present invention. The mineral acid reacts chemically with the benzazine to form a salt thereof. The salt formation stabilizes the heterocyclic ring of the benzazine against attack, thereby directionally orienting that attack to the carbocyclic ring. The ozone-inert mineral acids used in the invention are excellent solvents for benzazines. They are non-inflammable and do not promote decomposition of the ozone. These useful acids include nitric acid, sulfuric acid, phosphoric acid, chlorosulfonic acid, fluosulfonic acid, and the like. Mineral acids such as hydrochloric acid are not particularly useful, since they are subject to ozone attack and thus provide only low yields of the desired product.

Among the mineral acids, nitric acid is a superior ozonation vehicle, since it serves as a reservoir of oxygen capable of oxidizing the ozonation products during the oxidation step, hereafter described, without the addition of another oxidizing agent, provided that it is present in sufficient amount to convert the ozonation product to the desired pyridine di-carboxylic acid and at the same time to destroy the two carbon fragments which are split off from the benzazine molecule.

The specific concentrations of benzazine and mineral acid in the ozonation medium are not particularly critical. However, it is essential to the present invention to provide in the liquid medium at least about one mole of mineral acid per mole of benzazine to obtain complete conversion of the benzazine to the mineral acid salt of the benzazine, thus stabilizing the N-hetero ring against ozone attack.

For ease of operation, the benzazine is added to the liquid medium in an amount ranging from between about 5–30% by weight. The suggested upper limit of concentration is practical rather than theoretical, since it is governed by mechanical factors such as the ozone distribution and the ease of handling the crystals of pyridine di-carboxylic acids formed during a subsequent step in the process.

The concentration of mineral acid added to form the liquid medium is determined more by convenience than by necessity. When nitric acid is used, a concentration of 30 to 70% (the $HNO_3$-water azeotrope) by weight is quite acceptable. Commercial concentrated sulfuric acid (96% by weight) also works well in the process. When less concentrated mineral acids are used, the concentration of water in the liquid medium is obviously increased. The presence or absence of water in the liquid medium of the invention has no apparent effect on the ozonation of the benzazine. The amount of water present is important only to the extent that it influences the desired concentration of the benzazine in the liquid medium and the rate of absorption of ozone by the liquid medium. The use of concentrated mineral acids (i.e. less water) tends to give better ozone absorption and for this reason is preferred.

Improved ozone absorption is also obtained by adding a solubilizing agent for the ozone to the liquid medium containing the mineral acid. The use of a solubilizing agent is not necessary and the amount of such agent used is not critical. From a practical standpoint, the amount added is governed by the desired concentration of benzazine in the ozonation medium, the amount of mineral acid used, and the amount of crystals of the product dicarboxylic acid which will be formed after the heating step. We have found it convenient to add from about ½ to 2 parts by weight of solubilizing agent for each part by weight mineral acid present in the liquid medium. The solubilizing agent does not affect the orientation of the ozone attack on the benzazine. The agent should be inert to attack by ozone and by the mineral acid, and should be miscible with the mineral acid. With these considerations in mind, we have found that acetic is an excellent solubilizing agent. Its use is particularly convenient when nitric acid is used as the mineral acid, since acetic acid boils within 3° C. of the nitric acid-water constant boiling mixture and it can be readily recovered without complication of the process.

An oxygen-containing gas is used as a carrier for the ozone during the reaction. The type of gaseous carrier and the concentration of ozone therein depends upon the type of equipment used. Certain generators provide a stream of ozone in air in concentrations ranging from 0.5–8% by weight. Others provide ozone in oxygen, the concentration of ozone being between 2 and 16% by weight. The entire range of ozone concentrations provided by either type of generating equipment is suitable for purposes of the invention.

To obtain high yields of products by the method of the invention, it is desirable to use at least about a stoichiometric quantity of ozone based upon the starting amount of benzazine (2 moles of ozone per mole of benzazine). No particular advantage is seen in using more than about 3 moles of ozone per mole of benzazine in view of the obvious waste of ozone involved. The preferred range of ozone utilization is 2.1–2.5 moles of ozone per mole of benzazine.

Conventional equipment may be used to disperse the ozone in the liquid medium containing the benzazine. It is preferable to introduce the ozone-containing gas in the form of small bubbles to insure intimacy of contact. The rate of ozone addition is determined by the ability of the liquid medium to absorb the ozone. It is, of course, commercially desirable to ozonize as rapidly as possible, but care should be taken to avoid a rate of ozone addition greater than the rate of absorption of the ozone by the reaction medium. Usage of ozone in this manner is obviously wasteful. Moreover, explosive mixtures of gases may be formed in the equipment. The rate of ozone addition may be conveniently governed by an ozone meter placed downstream from the reaction vessel to determine whether all of the ozone added is being absorbed.

The reaction between ozone and the benzazine is almost instantaneous. The reaction time will, therefore, depend upon a starting quantity of benzazine and the intimacy of contact between the ozone and the benzazine. The reaction is continued until the desired quantity of ozone has been absorbed.

The reaction is conducted at atmospheric pressure (although higher or lower pressures can be used) over a temperature range of about 0–120° C. The temperature of ozonation is not critical, although higher temperature tend to increase the rate of ozone absorption. When ozonation is carried out at temperatures below about 45–65° C. it is more efficient, from the standpoint of ozone absorption, to conduct the reaction in the presence of an ozone solubilizing agent in order to compensate for the effect of temperature on the rate of reaction.

After the formation of ozonation products, the reaction mixture is heated in the presence of an oxidizing agent at a temperature below the boiling point of the mixture to convert the ozonation product to the desired pyridine dicarboxylic acid. We have observed that, when nitric acid is used as the oxidizing agent, after the temperature of the mixture is raised to above about 60° C. a strong, exothermic reaction takes place. It is, therefore, advisable to exercise care in heating the ozonized mixture in order to maintain control of the reaction. We have found it convenient, although not essential, to heat the mixture to about 60–80° C. and then charge it stepwise to a heel, containing crystals of the product pyridine dicarboxylic acid, which is maintained at a temperature of about 80–100° C. to offset the effect of the exothermic reaction and to permit solvent removal by continuous flash distillation. Since conversion of the ozonation product to pyridine di-carboxylic acid is quite rapid, only a few minutes heating time is required to insure its completion.

The use of an oxidizing agent is necessary to convert the ozonation product to the desired pyridine di-carboxylic acid. As we have already noted, when nitric acid is used as the mineral acid in sufficient amount during the ozonation step, it also serves as the oxidizing agent. Under these conditions, if the temperature of ozonation is above about 60–65° C. the ozonation products will be oxidized as they are formed during the ozonation step. The simultaneous formation and oxidation of the ozonation products is of particular significance during continuous operation of the method of the invention. Oxidation may also be accomplished simultaneously with a concentration step to remove the aqueous or acidic portion of the liquid medium from the crystals of pyridine di-carboxylic acid.

At least about 3 moles of oxidizing agent per mole of ozonation products must be present during the oxidation step. We believe that about one mole of oxidizing agent is required to produce the pyridine di-carboxylic acid from its parent ozonation product and about two moles are necessary to destroy the hydrocarbon fragment split off from the benzazine during ozonation. If nitric acid is used as the mineral acid during ozonation in the minimum amount (i.e. one mole of 100% $HNO_3$ per mole of benzazine), only two additional oxidizing equivalents of oxidizing agent must be added during oxidation, since the nitric acid which is chemically combined with the benzazine will be liberated during ozonation. It is often convenient to use at least about three moles of nitric acid in forming the liquid medium for ozonation to obviate adding more oxidizing agent after ozonation is complete. If mineral acids other than nitric acid are used during ozonation, oxidation is accomplished by adding to the ozonized mixture at least about three oxidizing equivalents of oxidizing agent for each mole of ozonation product formed during the course of the reaction. Suitable oxidizing agents include nitric acid, hydrogen peroxide, chromic acid, potassium permanganate, potassium perchlorate, and the like.

To facilitate recovery of the product it is desirable to concentrate the reaction mixture by removing, preferably by distillation, a substantial part of the liquid portion thereof either during or after the oxidation of the ozonation product to form the pyridine di-carboxylic acid. During the ozonation of the benzazine, substantially all of the mineral acid which was chemically combined therewith is released as the free acid. Thus the liquid portion removed from the reaction mixture after or during the oxidation step comprises water, mineral acid, solubilizing agent or an azeotropic mixture of water and mineral acid, depending upon the relative concentration of water and mineral acid originally present in the ozonation medium and upon the tendency of the mineral acid to form an azeotrope with water. A small portion of the liquid medium may be left with the solid product. The liquid medium may be removed by evaporation, although it is obviously preferable to recover it for reuse by distillation.

The crude pyridine di-carboxylic acid thus obtained is purified using conventional techniques; i.e. by washing or crystallization from a solvent such as water.

If desired, the pyridine di-carboxylic acid may be converted to the pyridine mono-carboxylic acid by decarboxylation, using methods conventional in the art. The most direct way of effecting decarboxylation is to heat the pyridine di-carboxylic acid to its decomposition temperature. For example, quinolinic acid decomposes into nicotinic acid and carbon dioxide at 190° C. Cinchomeronic acid is decarboxylated to form a mixture of nicotinic and isonicotinic acids at a temperature of about 260° C. Pure pyridine mono-carboxylic acids may be obtained by heating the pyridine di-carboxylic acid at a temperature sufficiently high to cause both sublimation and decomposition of the di-carboxylic acid, e.g. to a temperature of about 200–260° C. for quinolinic acid. The sublimed material may be condensed in water and crystallized therefrom to produce pure pyridine mono-carboxylic acid.

The method of the present invention is readily adaptable to continuous operation. In the continuous embodiment of the invention, a feed stream comprising nitric acid and benzazine in an amount of at least about one mole of nitric acid per mole of benzazine is continuously charged to an ozonation zone. An ozone-containing gas is continuously passed through the zone and contacted with the benzazine (in the form of its nitrate) to form ozonation products. The nitric acid concentration in the ozonation reaction mixture is maintained at a level such as to provide at least about three moles of nitric acid per mole of ozonation products to effect complete oxidation of the parent ozonation product to the desired pyridine di-carboxylic acid and destruction of the hydrocarbon fragment split off from the benzazine during ozonation. If the temperature in the ozonation zone is about 60–100° C. oxidation of the ozonation products occurs as they are formed. At lower ozonation temperatures oxidation is accomplished during the subsequent concentration step. A stream of the ozonized reaction mixture is continuously withdrawn and is continuously concentrated by evaporating water therefrom or by distilling to remove water, nitric acid-water azeotrope, or nitric acid-water azeotrope and solubilizing agent (if present). The nitric acid-water azeotrope and solubilizing agent can be returned to the process for reuse. The concentrate is cooled and filtered to separate the crude pyridine di-carboxylic acid from the nitric acid filtrate. Unreacted benzazine, being more strongly basic than the pyridine di-carboxylic acid, remains in the nitric acid filtrate in the form of benzazine nitrate, and is conveniently recharged to the ozonation step. By operating with high concentrations of pyridine di-carboxylic acid in the recycle stream, it is possible to limit the concentration step to the removal of water in excess of the amount which is required to dilute make-up concentrated acid to the strength of that used in ozonation. The crude di-carboxylic acid is washed with water and purified in a conventional manner. Washings which contain a substantial amount of nitric acid can be returned to the process for reuse. The pyridine di-carboxylic acid can be converted to the mono-carboxylic acid if desired.

Our invention is further illustrated by the following examples.

EXAMPLE I 10 parts of pure quinoline was dissolved in 276 parts of aqueous nitric acid (60% $HNO_3$, 40% water). The solution was heated to 40° and an ozone-oxygen stream (8% of ozone) was bubbled through at a rate of 0.8 part by weight per minute until 8.9 parts of ozone had been absorbed. This corresponds to 2.4 moles ozone per mole of quinoline. The ozonized solution was now heated to its boiling point, refluxed for 2 hours, then distilled to near dryness. The still residue, crude quinolinic acid, was crystallized from hot water to yield pure quinolinic acid, melting point 190° C. (d), neutral equivalent 82.3 (theoretical 82.3), yield 90% of the theoretical. A portion of the quinolinic acid was sublimed at atmospheric pressure. The sublimed product was pure nicotinic acid, melting point 235–237° C., which had resulted from decarboxylation of the quinolinic acid at sublimation temperatures (220–230° C.)

EXAMPLE II

The method of Example I was applied to a commercial 2° quinoline distillation fraction (92% quinoline). The yield of quinolinic acid based on the quinoline in the charge stock was the same as for the pure quinoline.

EXAMPLE III

The method of Example I was applied to pure isoquinoline. The product was cinchomeronic acid, purity 95%, yield 95% of the theoretical.

EXAMPLE IV

Following the procedure of Example I, three runs were made at varying temperatures to determine the effect of temperature during the ozonation step. The results are shown hereunder in Table I.

Table I
EFFECT OF TEMPERATURE OF OZONATION

| Run No. | Temperature, °C. | Conc. HNO₃, Percent | Yield, Percent | Approx. Ave. Percent O₃ Absorption |
|---|---|---|---|---|
| 1 | 25-30 | 60 | 89.6 | Less than 50. |
| 2 | 40-45 | 60 | 90.0 | 80. |
| 3 | 60-65 | 60 | 98.0 | 85. |

The data of Table I make it readily apparent that the only significant effect of the ozonation temperature is upon the rate of ozone absorption.

EXAMPLE V

Following the procedure of Example I, three runs were made using nitric acid of various concentrations as the liquid medium. The results are shown below in Table II.

Table II
EFFECT OF NITRIC ACID CONCENTRATION

| Run No. | Temperature, °C. | Conc. HNO₃, Percent | Yield, Percent | Approx. Ave. Percent O₃ Absorption |
|---|---|---|---|---|
| 1 | 45 | 30 | 90 | Less than 50. |
| 2 | 45 | 60 | 90 | 80. |
| 3 | 45 | 70 | 90 | 85. |

It is apparent from the table that the concentration of the mineral acid added affects only the rate of ozone absorption.

EXAMPLE VI

A run was made following the procedure of Example I with the exception that glacial acetic acid was substituted for one-half of the volume of 60% nitric acid there in employed. The ozonation was carried out at room temperature (25° C.). The ozone absorption (about 80% of that introduced) was significantly better than that obtained in the absence of acetic acid. The yield of quinolinic acid was 93.8%.

EXAMPLE VII

Following the procedure of the previous examples, a mixture consisting of 157 parts by weight of glacial acetic acid, 50 parts of water, and 7.7 parts of 70% nitric acid was used as ozonation solvent. This quantity of nitric acid is equivalent to 1.1 moles of nitric acid per mole of quinoline charged. Ozone absorption was excellent at 99% of that introduced. The ozonation product was treated with 64 parts of 70% $HNO_3$, and quinolinic acid was isolated in the usual manner. Yield was 76.4%, somewhat lower than is obtained when larger amounts of nitric acid are present during ozonation.

EXAMPLE VIII 157 parts by weight of glacial acetic acid, 50 parts of water and 10 parts of quinoline were treated with ozonized oxygen at 45° C. until 8.9 parts of ozone had been absorbed. Ozone absorption was excellent at about 99% of that introduced. Removal of the water and acetic acid at reduced pressure yielded a dark viscous residue from which crystalline material could not be isolated.

The experiment was repeated with the exception that the ozonation product was treated with 64 parts of concentrated nitric acid before distillation. 3.4 parts of relatively impure quinolinic acid (175-234° C.) equivalent to 25% yield was recovered.

These experiments show that it is essential to have an ozone-inert mineral acid present during the ozonation step.

EXAMPLE IX

The ozonation solvent used herein was a mixture of 210 parts of glacial acetic acid and 7.6 parts of concentrated sulfuric acid. This quantity of sulfuric acid is equivalent to 1.0 mole of acid per mole of quinoline charged. Ozone absorption was excellent at 99%. The ozonation product was treated with 35 parts of water and 64 parts of concentrated nitric acid. The nitric acid, acetic acid, and water were substantially removed by slow evaporation on a steam bath. 9.6 parts of quinolinic acid separated from the acid residue on cooling and were recovered by filtration. This is equivalent to a 74% yield. Only very small additional amounts of product were obtained from the mother liquor by neutralization (pH 1.5) and evaporation. The residue was a dark viscous solution containing sodium acid sulphate. Small amounts of quinolinic acid may have been present together with tar.

EXAMPLE X

The ozonation solvent used herein was 157 parts of glacial acetic acid, 50 parts of water, and 11.4 parts of concentrated sulfuric acid. This amount of sulfuric acid is equivalent to 1.5 moles per mole of quinoline charged. Ozone absorption at 99% was excellent. The reaction product was treated with 64 parts of concentrated nitric acid. The water, acetic acid and nitric acid were substantially removed by slow evaporation on a steam bath. Yield of quinolinic acid recovered was 72.5% of theory. As in Example IX, the residue after neutralization and evaporation (pH 1.5) was dark and viscous from which only very small additional quantities of quinolinic acid could be recovered.

EXAMPLE XI 276 parts of 60% nitric acid and 10 parts of quinaldine (2-methylquinoline) were treated at 44° C. with ozonized oxygen in the usual manner until 8.3 parts (2.48 moles equivalents) of ozone had been absorbed. The ozonation product was refluxed for 2 hours and then concentrated to a small volume of residual nitric acid. Upon cooling, 11.0 parts of crude 6-methyl quinolinic acid were recovered by filtration. The neutral equivalent of the product was 89.9, theory 90.5. Sublimation at 200-230° C. gave a product having neutral equivalent 137.5. Theory for methyl nicotinic acid is 137.0. The product had a melting point of 210-211.5° C. The literature (Kooyman and Wibaut, Rec. Trav. Chim. 65, 10 (1946)), gives 209-210° C. for 6-methyl nicotinic acid.

We claim:

1. Method of making pyridine carboxylic acids comprising contacting ozone with a benzazine selected from the group consisting of quinoline, isoquinoline and nuclear-substituted quinolines and isoquinolines, wherein the nuclear substituents are attached to the carbocyclic ring and are members selected from the group consisting of lower alkyl, amino, halo and hydroxyl groups, in a liquid medium containing a mineral acid which is substantially inert to ozone attack in an amount of at least about one mole of mineral acid per mole of benzazine to form ozonation products, heating the reaction mixture in the presence of an oxidizing agent at a temperature below the boiling point of said mixture, and recovering a pyridine carboxylic acid from the residue.

2. Method of making pyridine carboxylic acids comprising contacting ozone with a benzazine selected from the group consisting of quinoline, isoquinoline and nuclear-substituted quinolines and isoquinolines, wherein the nuclear substituents are attached to the carbocyclic ring and are members selected from the group consisting of lower alkyl, amino, halo and hydroxyl groups, in a liquid medium containing a mineral acid which is substantially inert to ozone attack in an amount of at least about one mole of mineral acid per mole of benzazine to form ozonation products, heating the reaction mixture in the presence of an oxidizing agent at a temperature below the boiling point of said mixture, concentrating said mixture and recovering a pyridine di-carboxylic acid from the residue.

3. Method according to claim 2 wherein the mineral acid is nitric acid.

4. Method according to claim 2 wherein a solubilizing agent for the ozone is present in the liquid medium.

5. Method according to claim 2 wherein the mineral acid is sulfuric acid.

6. Method according to claim 2 wherein the oxidizing agent is nitric acid.

7. Method of making pyridine carboxylic acids comprising contacting a benzazine selected from the group consisting of quinoline, isoquinoline and nuclear-substituted quinolines and isoquinolines, wherein the nuclear substituents are attached to the carbocyclic ring and are members selected from the group consisting of lower alkyl, amino, halo and hydroxyl groups, with ozone in a liquid medium containing nitric acid in an amount of at least about one mole of nitric acid per mole of benzazine to form ozonation products, heating the reaction mixture in the presence of at least 3 moles of nitric acid per mole of ozonation products at a temperature below the boiling point of said mixture, concentrating said mixture by distillation and recovering a pyridine carboxylic acid from the residue.

8. Method of making pyridine carboxylic acids comprising contacting an ozone-containing gas with a benzazine selected from the group consisting of quinoline, isoquinoline and nuclear-substituted quinolines and isoquinolines, wherein the nuclear substituents are attached to the carbocyclic ring and are members selected from the group consisting of lower alkyl, amino, halo and hydroxyl groups, in a liquid medium containing a mineral acid which is substantially inert to ozone attack in an amount of at least about one mole of mineral acid per mole of benzazine to form ozonation products, heating the reaction mixture in the presence of at least three oxidizing equivalents of a strong oxidizing agent per mole of ozonation products at a temperature between about 60–100° C., concentrating said mixture by distillation, recovering a pyridine di-carboxylic acid from the residue, and decarboxylating said di-carboxylic acid to form a pyridine mono-carboxylic acid.

9. Method of making quinolinic acid comprising adding quinoline to an aqueous medium containing concentrated nitric acid in an amount of at least one mole of $HNO_3$ per mole of quinoline added, passing an ozone-containing gas into the mixture until at least about two moles of ozone per mole of quinoline is absorbed to form ozonation products, heating the resulting mixture to a temperature below the boiling point of said mixture, concentrating said mixture by distillation, and recovering quinolinic acid from the residue.

10. Method of making quinolinic acid comprising adding about 5–30% by weight quinoline to an aqueous medium containing concentrated nitric acid in an amount of at least one mole of $HNO_3$ per mole of quinoline added, passing an ozone-containing gas into the mixture until at least about two moles of ozone per mole of quinoline is absorbed to form ozonation products, heating the resulting mixture in the presence of at least three moles of nitric acid per mole of ozonation products to a temperature below the boiling point of said mixture, removing water and nitric acid from said mixture by distillation, and recovering quinolinic acid from the residue.

11. Method of making quinolinic acid comprising adding about 5–30% by weight quinoline to an aqueous medium containing acetic acid and concentrated nitric acid in an amount of at least one mole of $HNO_3$ per mole of quinoline added, passing an ozone-containing gas into the mixture at a temperature of 0–120° C. until about 2.1–2.5 moles of ozone per mole of quinoline is absorbed to form ozonation products, heating the resulting mixture in the presence of at least three moles of nitric acid per mole of ozonation products, simultaneously removing water and nitric acid from said mixture by distillation, and recovering quinolinic acid from the residue.

12. Method of making cinchomeronic acid comprising adding about 5–30% by weight isoquinoline to an aqueous medium containing concentrated nitric acid in an amount of at least one mole of $HNO_3$ per mole of isoquinoline added, passing an ozone-containing gas into the mixture until at least about two moles of ozone per mole of quinoline is absorbed to form ozonation products, heating the resulting mixture in the presence of at least three moles of $HNO_3$ per mole of ozonation products to a temperature below the boiling point of said mixture, removing water and nitric acid from said mixture by distillation, and recovering cinchomeronic acid from the residue.

13. Method of making nicotinic acid comprising adding about 5–30% by weight quinoline to an aqueous medium containing concentrated nitric acid in an amount of at least one mole of $HNO_3$ per mole of quinoline added, passing an ozone-containing gas into the mixture until at least about two moles of ozone per mole of quinoline is absorbed to form ozonation products, heating the resulting mixture in the presence of at least three moles of $HNO_3$ per mole of ozonation products to a temperature below the boiling point of said mixture, removing water and nitric acid from said mixture by distillation, recovering quinolinic acid from the residue, and heating the quinolinic acid to a temperature of at least 190° C. to form nicotinic acid.

14. Method of making 6-methylquinolinic acid comprising adding about 5–30% by weight quinaldine to an aqueous medium containing concentrated nitric acid in an amount of at least one mole of $HNO_3$ per mole of quinaldine added, passing an ozone-containing gas into the mixture until at least about two moles of ozone per mole of quinaldine is absorbed to form ozonation products, heating the resulting mixture in the presence of at least one mole of $HNO_3$ per mole of ozonation products to a temperature below the boiling point of said mixture, removing water and nitric acid from said mixture by distillation, and recovering 6-methylquinolinic acid from the residue.

15. Method according to claim 14 wherein said 6-methylquinolinic acid is heated at an elevated temperature to form 6-methylnicotinic acid.

16. Method of making pyridine di-carboxylic acids comprising continuously passing a feed comprising nitric acid and benzazine selected from the group consisting of quinoline, isoquinoline and nuclear-substituted quinolines and isoquinolines, wherein the nuclear substituents are attached to the carbocyclic ring and are members selected from the group consisting of lower alkyl, amino, halo and hydroxyl groups, in a mole ratio of at least one mole of nitric acid per mole of benzazine into an ozonation zone, continuously contacting an ozone-containing gas stream with said feed in said zone to form ozonation products, maintaining the nitric acid concentration in the ozonation mixture at a level of at least three moles of nitric acid per mole of ozonation products formed to oxidize said ozonation products, continuously withdrawing a stream of said ozonation mixture, heating said stream of said ozonation mixture to concentrate said stream, cooling the concentrated stream, filtering to remove crystals of pyridine di-carboxylic acid, and returning the filtrate to the ozonation zone.

17. Method of making quinolinic acid comprising continuously passing a feed comprising nitric acid and quinoline in a mole ratio of at least one mole of nitric acid per mole of quinoline into an ozonation zone, continuously contacting an ozone-containing gas stream with said feed in said zone at a temperature of about 60–100° C. to form ozonation products, maintaining the nitric acid concentration in the ozonation mixture at a level of at least three moles of nitric acid per mole of ozonation products formed to oxidize said ozonation products, continuously withdrawing a stream of said ozonation mixture, concentrating said stream of said ozonation mixture, cooling the concentrated stream, filtering to remove crystals of quinolinic acid, and returning the filtrate to the ozonation zone.

References Cited in the file of this patent

FOREIGN PATENTS 17,003   Great Britain _____ of 1913

OTHER REFERENCES

Bailey et al.: J. Am. Chem. Soc., vol. 62, pp. 1967–1969 (1940).

Bailey et al.: J. Am. Chem. Soc., vol. 63, pp. 1365–1367 (1941).

Boer et al.: Rec. Trav. Chim. de Pays-Bas, vol. 70, pp. 509–520 (1951).

Lindenstruth et al.: J. Am. Chem. Soc., vol. 71, pp. 3020–3021 (1949).

Wibaut et al.: Rec. Trav. Chim. de Pays-Bas, pp. 241–256 (1955), vol. 74.